(12) United States Patent
Rockwell

(10) Patent No.: US 6,625,920 B1
(45) Date of Patent: Sep. 30, 2003

(54) DEVICE AND METHOD FOR FORMING FISH BAIT AROUND A FISH HOOK

(75) Inventor: Kirk Rockwell, Palmdale, CA (US)

(73) Assignee: Baiter-up, Inc., La Crescenta, CA (US)

( * ) Notice: Subject to any disclaimer, the term of this patent is extended or adjusted under 35 U.S.C. 154(b) by 0 days.

(21) Appl. No.: 09/695,007

(22) Filed: Oct. 23, 2000

(51) Int. Cl.[7] .............................................. A01K 97/04
(52) U.S. Cl. .................................................. 43/4; 43/55
(58) Field of Search .......................... 43/4, 55; 425/286

(56) References Cited

U.S. PATENT DOCUMENTS

| | | | | |
|---|---|---|---|---|
| 2,763,956 A | * | 9/1956 | Olson | 43/55 |
| 3,487,575 A | * | 1/1970 | Jones | 43/4 |
| 3,976,413 A | * | 8/1976 | Popeil | 425/117 |
| 4,309,162 A | * | 1/1982 | Parker | 425/126 |
| 4,850,129 A | * | 7/1989 | Hoepfner et al. | 43/4 |
| 4,965,955 A | * | 10/1990 | Campbell et al. | 43/4 |
| 5,067,270 A | * | 11/1991 | Garrick | 43/55 |
| 5,117,571 A | * | 6/1992 | Sites | 43/4 |
| 5,891,489 A | | 4/1999 | Rockwell | 426/1 |

* cited by examiner

Primary Examiner—Kurt Rowan
(74) Attorney, Agent, or Firm—Christie, Parker & Hale, LLP

(57) ABSTRACT

Apparatus for forming fish bait on a fish hook. The apparatus has a first mold unit with a first cavity and is connected to a channel in communication with a bore. The first mold unit has an access port in the vicinity of the first cavity formed through a sidewall of the first mold unit through which the fish hook may be inserted and removed, and the first mold unit has a threaded end. A second mold unit is removably engaged to the first mold unit, the second mold unit has a second cavity defined therein. The second mold unit has a means for closing and locking the first mold unit and the second mold unit with the first and second cavity is attached together to form a fish bait mold cavity therein when in a closed position. A bait canister is adapted to fit within the bore in the first mold unit. The bait canister has an aperture formed therein at a bottom wall thereof and is aligned with the channel. A threaded turning portion is adapted to thread onto the threaded end of the first mold unit, the threaded turning portion having a piston shaft attached thereto, the piston shaft being sized to slide within the bait canister when the threaded rotational portion is rotated so as to push against fish bait contained therein.

16 Claims, 5 Drawing Sheets

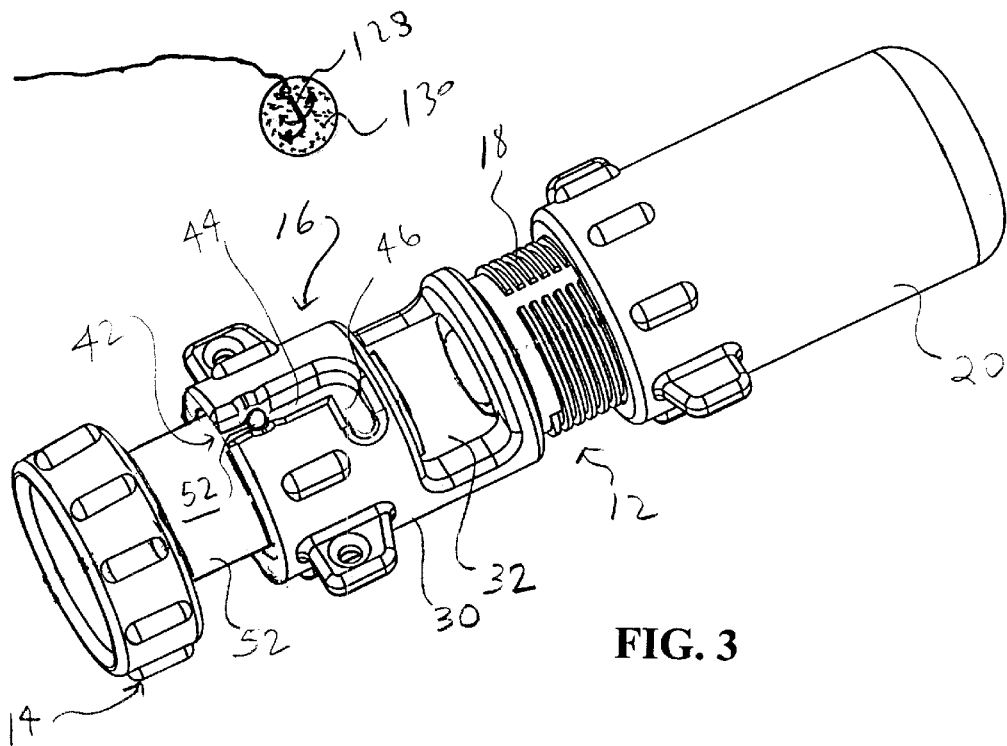
FIG. 3
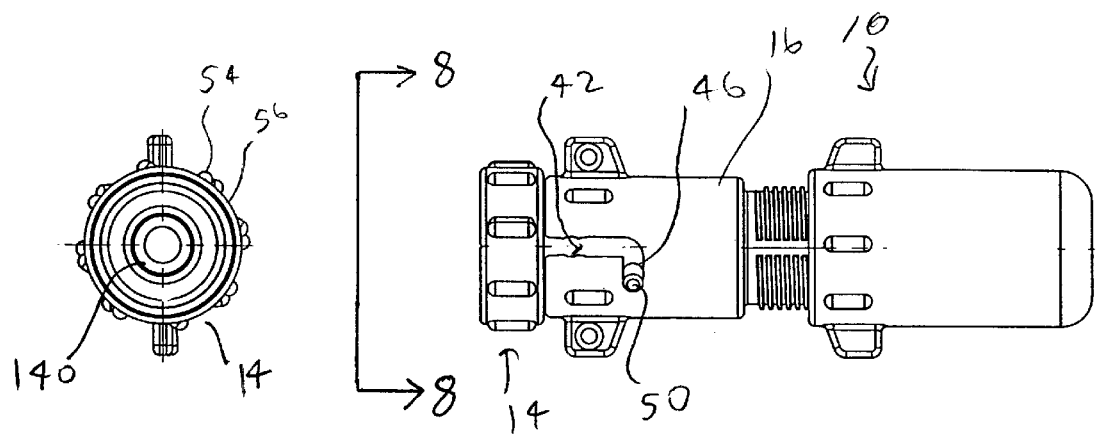
FIG. 8
FIG. 6
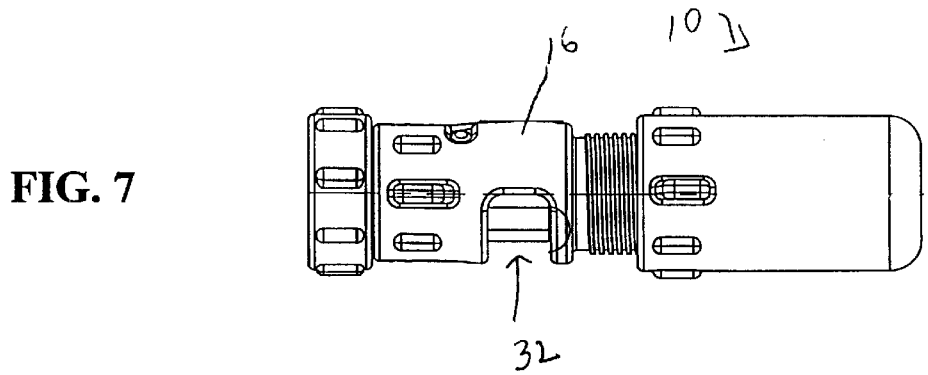
FIG. 7

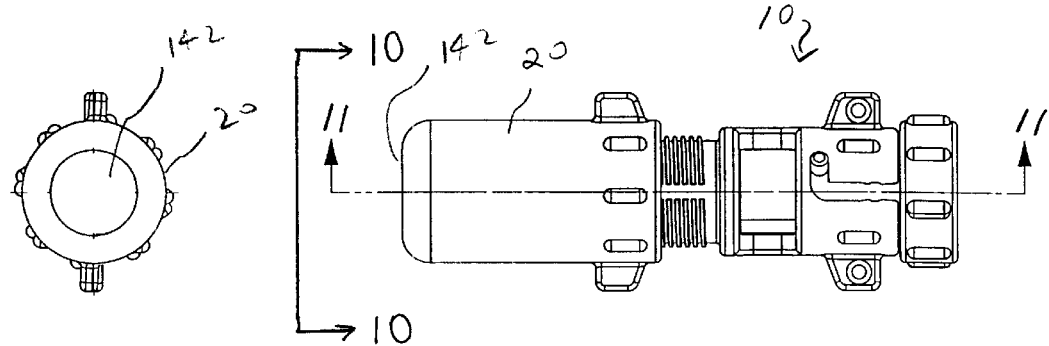
FIG. 10 FIG. 9
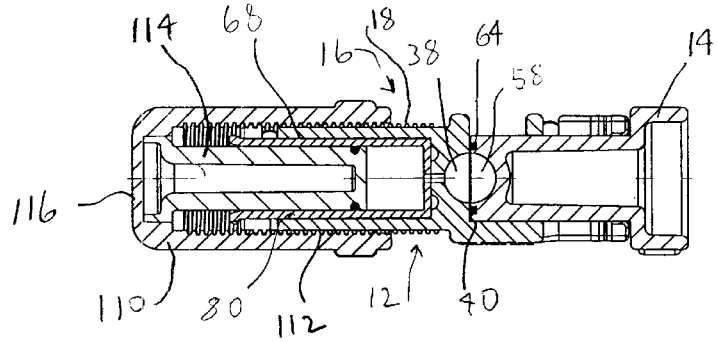
FIG. 11
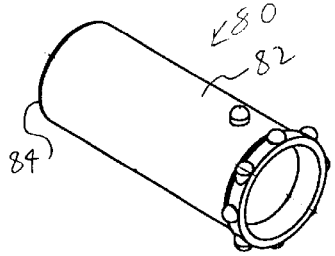
FIG. 13
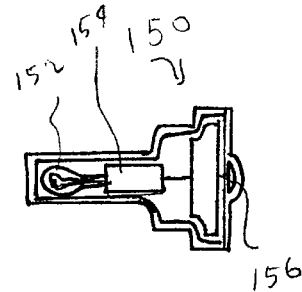
FIG. 12
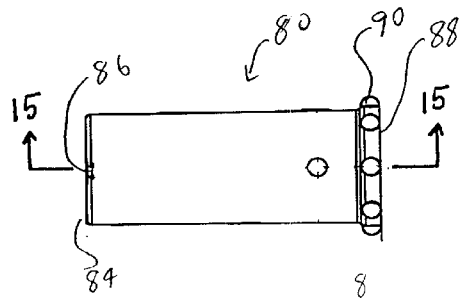
FIG. 14
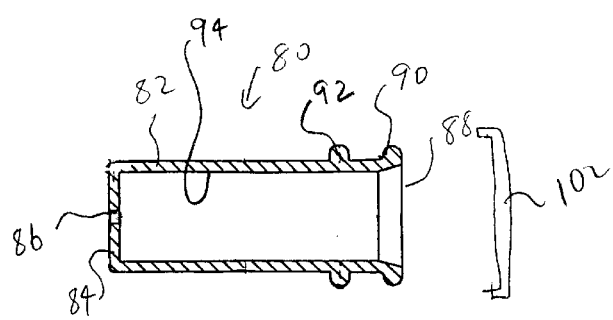
FIG. 15

DEVICE AND METHOD FOR FORMING FISH BAIT AROUND A FISH HOOK

BACKGROUND OF THE INVENTION

1. Field of the Invention

The invention relates to apparatus and methods used to mold or form fish bait on a fish hook, particularly apparatuses and methods to mold fish bait on a fish hook without the user having to physically touch the fish bait.

2. Description of Related Art

There are currently in use various devices, apparatuses and methods to form fish bait into a lure and/or place the bait on a fish hook. Generally these approaches tend to form or shape the fish bait prior to placing it on the fish hook. Common examples include mixing and placing the fish bait in containers or packages from which the bait may be removed to fit on the hook. Such methods include using pressurized containers containing bait which may then be extruded in the shape of a worm. The bait is then placed on the fish hook.

Other approaches include mixing the bait composition such that it may be cut into various shapes for use as fishing bait and as a lure. In addition there are simple apparatuses similar to a syringe, without a needle end, which has the tube open at one end such that it may be pushed into a malleable fish bait composition to fill the tube. The fish hook may then be pressed into the fish bait and the piston used to force the fish bait and hook from the syringe tube. In these types of devices and methods, the bait on the fish hook does not have to be touched by the user; however, the outside of the syringe has fish bait residue. In all of these known methods, contamination of the fish bait may occur by the user touching the apparatus or the bait itself. Thus human scent may be imported to the bait and the user may have fish bait on their hands as well as other areas.

The inventor's prior invention set forth in U.S. Pat. No. 5,891,489 recites an apparatus and method for molding fish bait on a fish hook that gets around many of the problems associated with prior art devices and methods, namely, the design obviates the need to touch the bait in order to form it around the fishhook. By not contaminating the bait the scent intended to attract the fish is not compromised. In addition, the user may bait fish hooks and fish without the need to continually clean up any fish bait residue which might result from handling the bait. Despite improvements in the invention improvement, the prior device can make changing between different bait types time consuming, raise manufacturing and assembly costs, and the overall usability of the apparatus.

SUMMARY OF THE INVENTION

A primary objective of the present invention is to provide an apparatus for molding or forming malleable or plastic (in the fluidity sense) fish bait onto and/or around a fish hook.

A further objective is to provide an apparatus for molding the fish bait in a desired shape.

It is another objective of this invention to provide an apparatus with easily replaceable bait cartridges for molding the fish bait around a fish hook.

It is still a further objective of this invention to provide an apparatus for molding the fish bait around a fish hook that is adapted for use in low light conditions.

It is yet another objective of this invention to provide a method to mold fish bait to a fish hook.

In accordance with the description presented herein, other objectives of this invention will become apparent when the description and drawings are reviewed.

BRIEF DESCRIPTION OF THE DRAWINGS

FIG. 3 is a perspective front view of the fish bait molder in its opened position, and with a baited hook removed.

FIG. 6 is a rear view of the fish bait molder in its closed position.

FIG. 7 is a side view of the fish bait molder in its closed position.

FIG. 8 is an end view of the fish bait molder through view lines 8—8 of FIG. 7.

FIG. 9 is a front view of the fish bait molder in its closed position.

FIG. 10 is an end view of the fish bait molder through view lines 10—10 of FIG. 9.

FIG. 11 is a cross-sectional view fish bait molder through view lines 11—11 of FIG. 9.

FIG. 12 is a side view of an optional light source for the fish bait molder.

FIG. 13 is a perspective view of a fish bait canister for the fish bait molder.

FIG. 14 is a side view of the fish bait canister of FIG. 13.

FIG. 15 is a cross-sectional view of the fish bait canister of FIG. 14 through view lines 15—15 of FIG. 14.

DETAILED DESCRIPTION OF THE INVENTION

Figure 1:
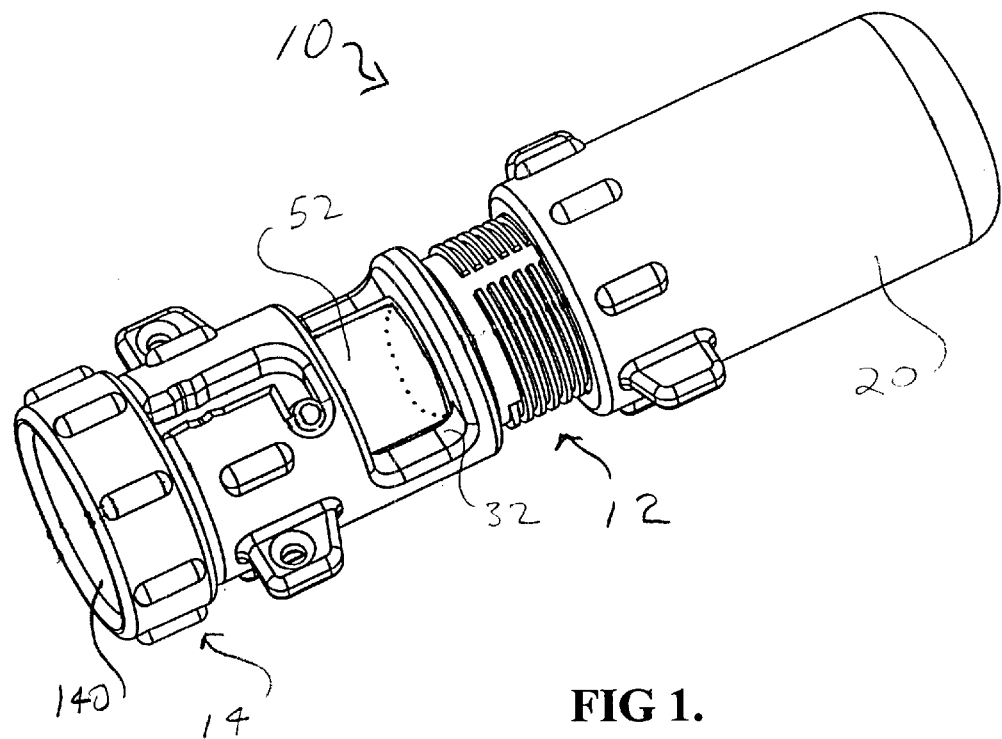
FIG. 1 is a perspective front view of the fish bait molder in its closed-position.

The fish bait molder has a two-part mold body having a separable mold cavity. The two-part mold body may be opened and closed to allow insertion of a fish hook, molding of fish bait on the hook and removal of the baited hook. The mold body has an inlet passage to allow fish bait to be forced by means of a piston into the mold cavity for forming the fish bait around the fish hook. In a preferred embodiment of the invention, the piston may be pressed against the fish bait by a threaded rotational means or other suitable force means.

Referring to FIGS. 1 through 5, fish bait molder 10 has a first mold unit 12 and a second mold unit 14 moveably engageable with first mold unit 12. First mold unit 12 has a body portion 16 with a threaded distal extension 18, and a piston driving portion 20 that is threadably engageable with body portion 16. Ears 22 and knurls 24 are preferably formed on piston driving portion 20 and ears 26 and knurls 28 are preferably formed on body portion 16. Ears 22 and 26 and knurls 24 and 28 aid a user in twisting body portion 16 and piston driving portion 20. Body portion 16 has a generally cylindrical region 30 rearwardly of its threaded distal extension 18, and has an access port 32 formed therethrough. Cylindrical region 30 has a generally cylindrical bore 34 formed therethrough from end 36 of body portion 16 into access portion 32. Lower end of access port 32 has a first cavity 38 formed therein, and is surrounded by a seating surface 40. First cavity 38 will preferably have a generally semispherical shape, and seating surface 40 is preferably flat and smooth. The first cavity 38 could have other shapes, if desired. At least one and preferably two L-shaped slots 42 are formed on generally cylindrical region 30, with longitudinal regions 44 and lateral regions 46. Longitudinal region 44 extends to end 36 of body portion 16. Protrusion 48 are preferably formed on inside edges of longitudinal regions 44 near end 36 to narrow the width L-shaped slot 42 to a width that is less than a width of guide pin 50 formed on a generally cylindrical shaft 52. Second mold unit 14 preferably has knurls 54 formed on an outer rim portion 56. A second cavity 58 is formed at a terminal end 60 of cylindrical shaft 52. Preferably, second cavity has a semi-cylindrical shape, and second cavity has a sealing means around its perimeter, such as provided by a channel 62, into which an O-ring 64, for example, can be located (see FIG. 4.)

Figure 2:
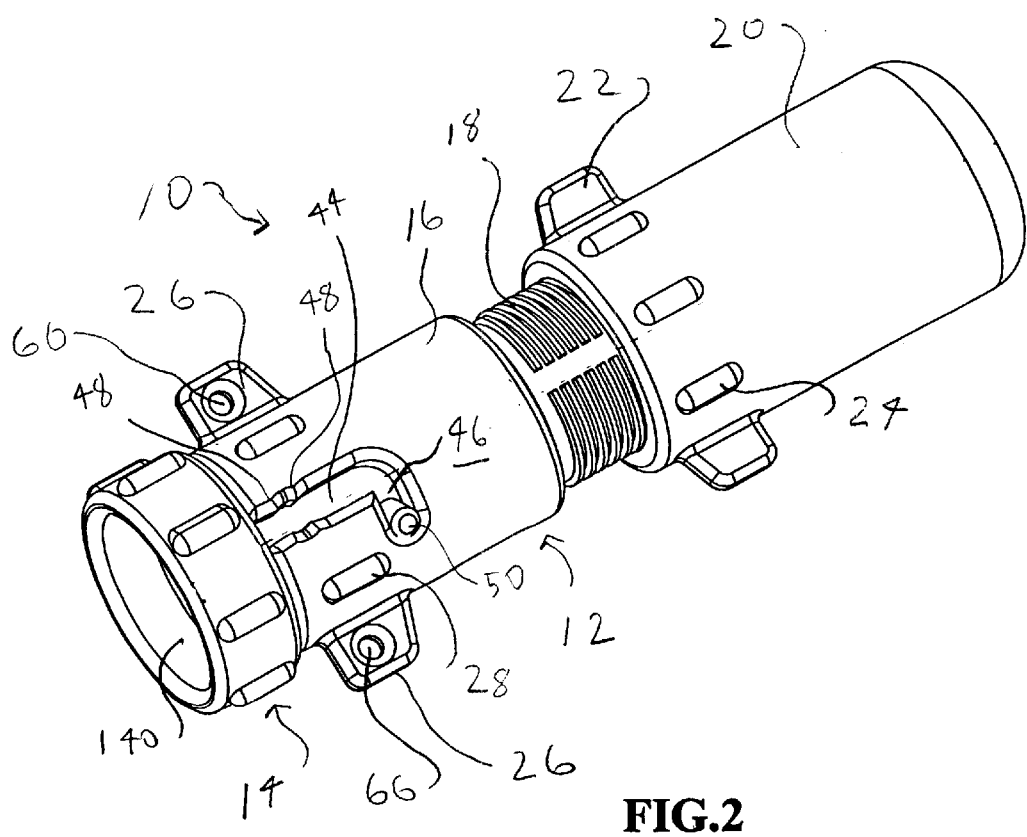
FIG. 2 is a perspective rear view of the fish bait molder in its closed,position.
Figures 4, 4A:
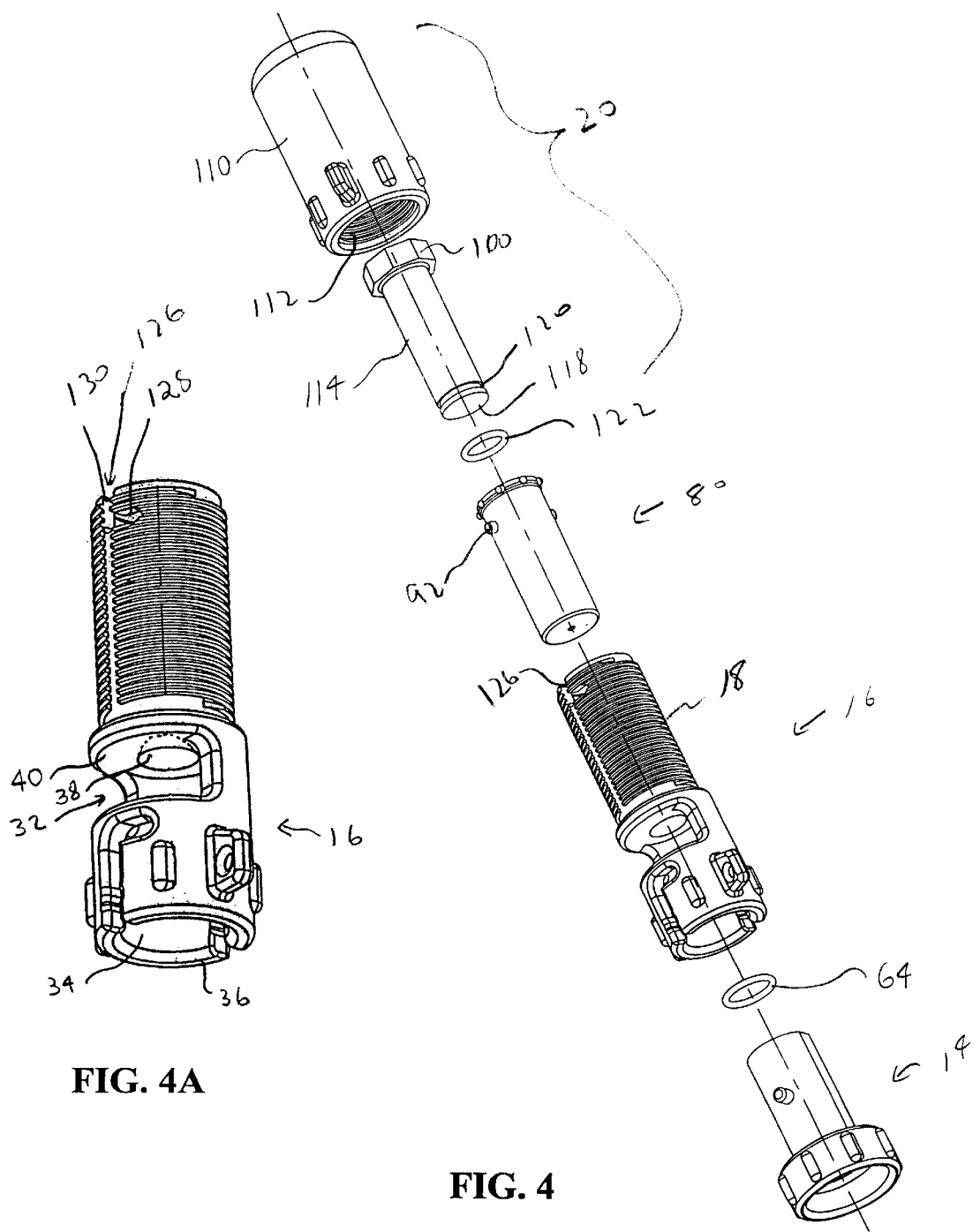
FIG. 4 is an exploded front view of the fish bait molder.
FIG. 4A is a perspective front view of the body portion of the fish bait molder.

Cylindrical shaft 52 is sized to be slidably received in cylindrical bore 34 of body portion 16. As shown in FIGS. 1 and 2, second mold unit 14 is inserted all the way into first mold unit 12, guide pin 50 will rest in lateral regions 46 of slot 44. In FIG. 3, second mold unit 14 is backed out from first mold unit 12 so that guide pins 50 rest in longitudinal regions 44 of slot 42, and adjacent to 48. Protrusion 48 in slot 44 prevent second mold unit 14 from inadvertently being withdrawn from first mold unit 12, but does permit detachment by pulling first mold unit 12 and second mold unit 14 apart, if desired (e.g. for assembly, cleaning, repair, etc. Also shown in FIGS. 1-3, apertures 66 are optionally formed in ears 26, which apertures can be used for attaching a lanyard or string (not shown) to the apparatus 10.

Figure 11A:
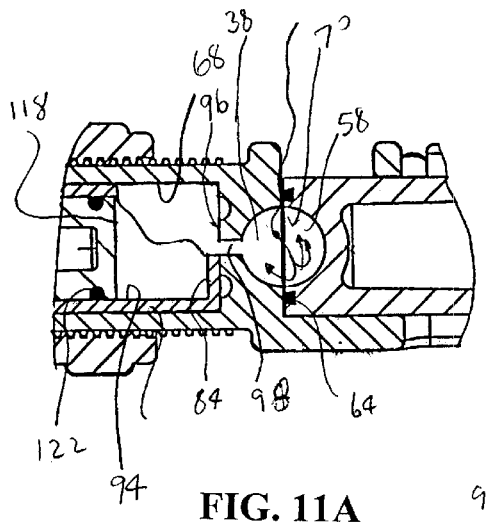
FIG. 11A is a partial cutaway detail of bait canister placed into the firsts mold unit.

Turning to FIGS. 11 and 11A, when second mold unit 14 is inserted all the way into first mold unit 12, first cavity 38 on body portion 16 and second cavity 58 on second mold unit 14 will be adjacent and O-ring will contact seat 40 and form a seal. When brought together, the first and second cavities 38 and 58, respectively, form a fish bait cavity 80. Threaded distal extension portion 18 has a cylindrical bore 68 formed therein and which is sized to slidably receive a bait canister 70. Bait canister 80 has a preferably cylindrical profile and is best shown in FIGS. 4, 5, 11, and 13–14. Bait canister 80 has cylindrical sidewalls 82, has a bottom wall 84 with an aperture 86 formed therein. At its open end 88, turning means 90 (such has provided by knurls) are preferably located to allow a user to grasp bait canister 80. On sidewalls 82 guide pins 92 extend outwardly therefrom. Bait canister 80 preferably has smooth cylindrical inner wall surfaces 94 with a predetermined diameter. Bait canisters 80 can be provided pre-loaded with bait (e.g. by the bait manufacturers), or the user can fill the bait canisters himself or herself prior to use. In the pre-loaded format, open end 88 can be sealed shut with bait canister 80 sized so that when placed into cylindrical bore 68 of body portion 18, bottom wall 84 of bait canister will contact a bottom seat 96 of cylindrical bore 68 with aperture 86 aligned with a channel 98 formed from cylindrical bore 68 into first cavity 38, as best shown in FIGS. 11 and 11A.

Turning to FIGS. 4, 5, 5A, and 11, piston driving portion 20 includes a female threaded turning portion 110 which has internal threads 112 adapted to threadably mate with threaded extension portion 18 of body portion 16. A cylindrical piston shaft 114 which is coaxially positioned within a female threaded portion and is attached to bottom wall 116, e.g. by mechanical means and/or adhesives. In order to provide for a secure attachment, a bottom end 100 of piston has a shape that resists twisting when engaged with a complementary shaped bottom wall 116 of female threaded turning portion 110, such as provided by a polygonal shape (e.g. hexagonal.) Alternately, piston driving portion 20 can be a unitary structure. Piston shaft 114 is sized to slidably fit into bait canister. Near a distal end 118 of piston shaft 114, a channel 120 is preferably formed, into which a sealing means, such as an O-ring 122 will be placed. At a distal end 124 of threaded extension portion 18, at least one L-shaped slot 126 is formed. L-shaped slot is adapted so that bait canister 80 can be slid into cylindrical bore 68 with protrusion 92 positioned in L-shaped slot 126, thereby "locking" bait canister 80 in cylindrical bore 68. A lateral portion 128 of slot 126 is preferably perpendicular to a longitudinal portion 130, and lateral portion 128 is in the same direction as a pitch of threaded extension portion 18, so that when female threaded turning portion 110 is unscrewed from threaded extension portion, any twisting action imparted from piston shaft 114 onto bait canister 80 will tend to move protrusion 92 on bait canister 80 into lateral portion 28 of L-shaped slot 126. When female threaded turning portion 110 is screwed onto threaded extension portion 18, piston shaft 112 will be driven downwardly into bait canister. O-ring 122 helps prevent bait from being forced anywhere other than through channel 98 into the cavities. Bait in bait canister 80 will be formed through aperture 86, through channel 98, and into first and second cavities 38 and 58, thereby forcing fish bait around a fishhook 132 placed into the cavities. A fishing line 134 tied to fishhook 132 will extend outside of cavities. The fish bait molder 10 can be made from transparent plastic material so that a user can actually see the fish bait in-fill the closed cavities. Also, due the relative incompressibility of the fish bait, after the cavities are filled and the bait 136 is formed around the fishhook 132, it will become difficult to turn female threaded turning portion 110 further. The user will then unscrew female threaded turning portion 110 to depressurize the fish bait in canister, and the user will back off second mold unit from its closed position of FIGS. 1 and 2 to its open position of FIG. 3, and remove fish bait 136 molded around fishhook 132 through access port 32.

FIG. 6 is a rear view of fish bait molder 10 in its closed position. As can be seen, protrusions 50 of second mold unit are slit into ends of lateral regions 47 of L-shaped slots 42 formed on body portion 16. FIG. 7 is a side view of fish bait molder 10 in its closed position, showing access portion 32 formed through body portion 16.

FIG. 8 is an end view of fish bait molder 10 through view lines 8—8 of FIG. 7, and shows an opening 140 formed therein.

FIG. 9 is a front view of fish bait molder 10 in its closed position, and FIG. 10 is an end view of fish bait molder through view lines 10—10 of FIG. 9, showing a top 142 of piston driving unit 20.

Figure 5A:
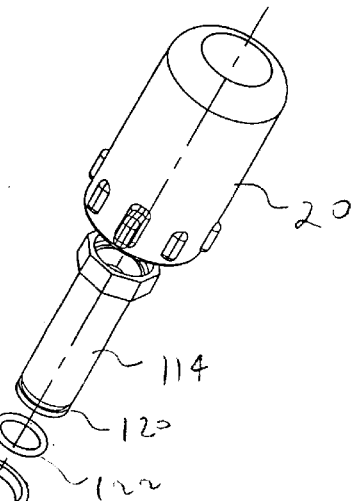
FIG. 5A is a perspective view of the second mold unit of the fish bait molder.
Figure 5:
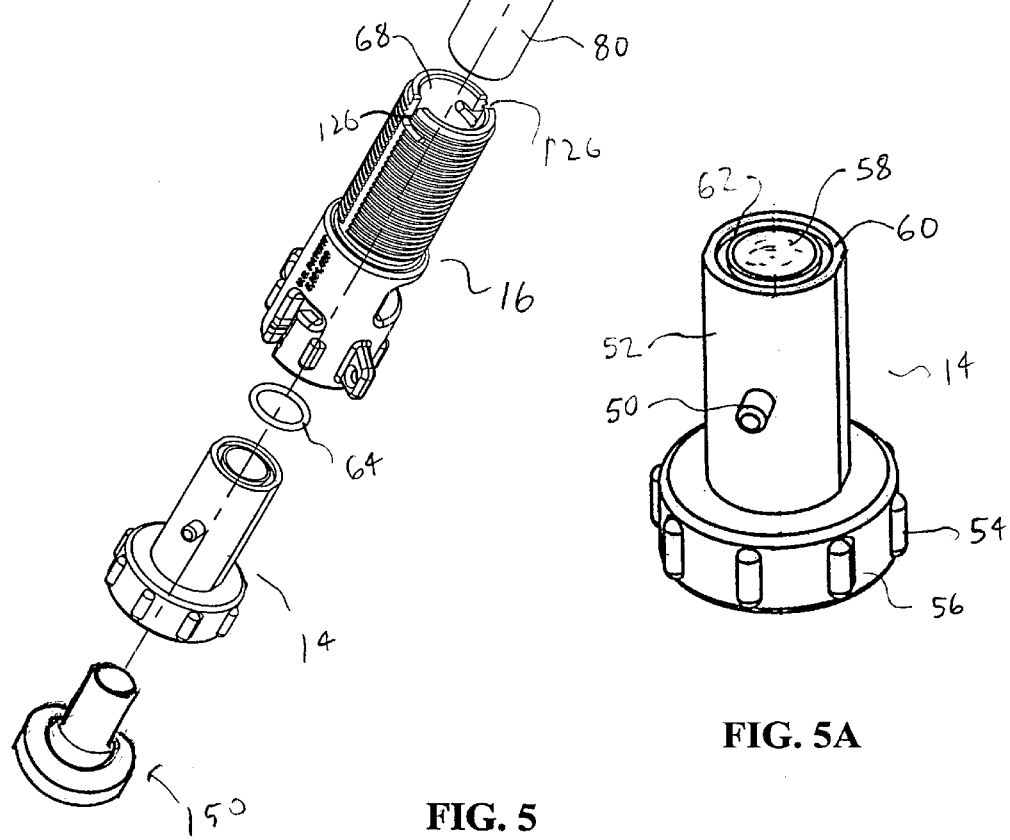
FIG. 5 is an exploded rear view of the fish bait molder with an optional light source.

Turning to FIG. 5, an exploded view of a fish bait molder with an optional light source 150 which is adapted to fit within second mold unit 12. FIG. 12 is a side view of light source 150. Light source 150 has a light 152 (e.g. an incandescent lamp, a high intensity LED, or some other light producing means), a battery 154 and a switch 156. Light source 150 can preferably have a shape that is adapted to fit within opening 140 in second mold unit 114, and more preferably will place the light source in such a position that the fisherman can place the fish hook into the access port, form the bait around the hook, and carry out the whole process, even under low light conditions, and without substantially interfering with the user's night vision. This feature will be useful for fishing in early morning hours or under otherwise poor lighting conditions.

As noted above, fish bait molder is preferably formed from transparent plastic. Use of smooth plastics, such as PVC also has another salubrious affect, inasmuch as the typically oily fish baits will easily release without leaving much if any residue in the cavities 38 and 58.

The drawings and the foregoing description are not intended to represent the only form of the invention in regard to the details of this construction and manner of operation. In fact, it will be evident to one skilled in the art that modifications and variations may be made without departing from the spirit and scope of the invention. Although specific terms have been employed, they are intended in a generic and descriptive sense only and not for the purpose of limitation, the scope of the invention being delineated in the following claims which follow.

What is claimed is:

1. An apparatus for forming fish bait on a fish hook, comprising:

a first mold unit having a first cavity, the first cavity being connected to a channel in communication with a bore, the first mold unit having an access port in the vicinity of the first cavity and at least one L-shaped slot extending to a distal end of the first mold unit, the L-shaped slot having a longitudinal region and a latitudinal region;

a second mold unit removably engaged to the first mold unit, the second mold unit having a second cavity defined therein, the second mold unit having a means for closing and locking the first mold unit and the second mold unit with the first and second cavity is together to form a fish bait mold cavity therein when in a closed position;

a bait canister adapted to fit within the bore in the first mold unit, the bait canister having an aperture formed therein at a bottom wall thereof and aligned with the channel, the bait canister having pins formed therein, the pins being adapted to slidably fit into the L-shaped slot to thereby lock the bait canister into the bore in the first mold unit; and a means for forcing a fish bait from the bait canister through the channel into the mold cavity.

2. The apparatus of claim 1, wherein the access port is formed through a sidewall of the first mold unit through which the fish hook may be inserted and removed.

3. The apparatus of claim 1, wherein the means for closing and locking comprises at least one L-shaped slot formed through the first mold unit, the L-shaped slot having a longitudinal region and a lateral region, and at least one guide pin formed on the second mold unit, with at least one guide pin being adapted to slide axially into at least one L-shaped slot and would rest in the lateral region when locked, and remain in the longitudinal region when in an opened position.

4. The apparatus of claim 3, wherein an O-ring is fitted on the second mold unit adjacent to its second cavity, which O-ring is adapted to contact with a seat formed adjacent to first cavity formed on the first mold unit.

5. The apparatus of claim 3, wherein the L-shaped slot extends to a proximal end of the first mold unit and wherein guide pins extend into the longitudinal region of the L-shaped slot, which protrusion will prevent the second mold unit from unintentionally being completely disengaged from first mold unit, yet allowing second mold unit to be disengaged from first mold unit by applying an intentional pulling force thereon.

6. The apparatus of claim 1, wherein the means for forcing the fish bait from the bait canister through the channel into the mold cavity comprises:

an outside wall of the first mold unit being threaded to receive a complementary threaded turning portion, and a piston shaft attached to the threaded turning portion, the piston shaft being sized to slide within in the bait canister when the threaded rotational portion is rotated so as to push against the fish bait contained therein.

7. The apparatus of claim 6, wherein the piston shaft includes an O-ring which slidably seals against an inner wall of the bait canister.

8. The apparatus of claim 1, wherein the first and second cavities are generally semi-spherical, and the fish bait mold cavity produced when the first and second cavities are brought together is generally spherical.

9. The apparatus of claim 1, wherein the apparatus is made from transparent material.

10. The apparatus of claim 1, further comprising knurls or wings formed on the first and second mold units.

11. An apparatus for forming fish bait on a fish hook, comprising:

a first mold unit having a first cavity, the first cavity being connected to a channel in communication with a bore, the first mold unit having an access port in the vicinity of the first cavity formed through a sidewall of the first mold unit through which the fish hook may be inserted and removed, the first mold unit having a threaded end and at least one L-shaped slot extending to a distal end of the first mold unit, the L-shaped slot having a longitudinal region and a latitudinal region;

a second mold unit removably engaged to the first mold unit, the second mold unit having a second cavity defined therein, the second mold unit having a means for closing and locking the first mold unit and the second mold unit with the first and second cavity is together to form a fish bait mold cavity therein when in a closed position;

a bait canister adapted to fit with in the bore in the first mold unit, the bait canister having an aperture formed therein at a bottom wall thereof and aligned with the channel, the bait canister having pins formed therein, the pins being adapted to slidably fit into the L-shaped slot to thereby lock the bait canister into the bore in the first mold unit; and a threaded turning portion adapted to thread onto the threaded end of the first mold unit, the threaded turning portion having a piston shaft attached thereto, the piston shaft being sized to slide within the bait canister when the threaded rotational portion is rotated so as to push against fish bait contained therein.

12. The apparatus of claim 11, wherein the means for closing and locking comprises at least one L-shaped slot formed through the first mold unit, the L-shaped slot having a longitudinal region and a lateral region, and at least one guide pin formed on the second mold unit, with at least one guide pin being adapted to slide axially into at least one L-shaped slot and rest in the lateral region when locked, and remain in the longitudinal region when in an opened position.

13. The apparatus of claim 11, wherein an O-ring is fitted on the second mold unit adjacent to its second cavity, which O-ring is adapted to contact with a seat formed adjacent to first cavity formed on the first mold unit.

14. The apparatus of claim 11, wherein the L-shaped slot extends to a proximal end of the first mold unit and wherein guide pins extend into the longitudinal region of the L-shaped slot, which protrusion will prevent the second mold unit from unintentionally being completely disengaged from first mold unit, yet allowing second mold unit to be disengaged from first mold unit by applying an intentional pulling force thereon.

15. The apparatus of claim 11, further comprising at least one L-shaped slot extending to a distal end of the first mold unit, the L-shaped slot having a longitudinal region and a latitudinal region, and the bait canister having pins formed therein, the pins being adapted to slidably fit into the L-shaped slot to thereby lock the bait canister into the bore in the first mold unit.

16. An apparatus for forming fish bait on a fish hook, comprising:

a first mold unit having a first cavity, the first cavity being connected to a channel in communication with a bore, the first mold unit having an access port in the vicinity of the first cavity;

a second mold unit removably engaged to the first mold unit, the second mold unit having a second cavity defined therein, the second mold unit having a means for closing and locking the first mold unit and the second mold unit with the first and second cavity is together to form a fish bait mold cavity therein when in a closed position;

a light source in the second mold unit to light up the fish bait mold cavity;

a bait canister adapted to fit within the bore in the first mold unit, the bait canister comprising a generally cylindrical container with a circular cross-section, an open top having the said circular cross-sectional opening, side walls uninterrupted by any apertures, a bottom wall having an aperture formed therein which aperture is aligned with the channel; and a means for forcing a fish bait from the bait canister through the channel into the mold cavity.

\* \* \* \* \*